(12) United States Patent
Ko et al.

(10) Patent No.: US 8,426,515 B2
(45) Date of Patent: *Apr. 23, 2013

(54) MASTER BATCH ELASTOMETER CONTAINING ORGANICALLY MODIFIED SILICA AND METHOD OF PREPARING THE SAME

(75) Inventors: Young Hoon Ko, Daejeon (KR); Jae Young Ko, Daejeon (KR); Dae Hyung Lee, Daejeon (KR); Haeng Shin Jang, Daejon (KR)

(73) Assignee: Korea Kumho Petrochemical Co., Ltd. (KR)

( * ) Notice: Subject to any disclaimer, the term of this patent is extended or adjusted under 35 U.S.C. 154(b) by 12 days.

This patent is subject to a terminal disclaimer.

(21) Appl. No.: 13/152,847

(22) Filed: Jun. 3, 2011

(65) Prior Publication Data

US 2012/0165477 A1 Jun. 28, 2012

(30) Foreign Application Priority Data

Dec. 24, 2010 (KR) ........................ 10-2010-0134949

(51) Int. Cl.
*C08L 9/06* (2006.01)
*C08J 3/22* (2006.01)

(52) U.S. Cl.
USPC ........... 524/575; 524/570; 524/571; 428/403; 428/405; 523/351

(58) Field of Classification Search ........................ None
See application file for complete search history.

(56) References Cited

U.S. PATENT DOCUMENTS

| 5,925,713 | A | 7/1999 | Labauze | |
|---|---|---|---|---|
| 6,420,456 | B1 * | 7/2002 | Koski | 523/213 |
| 7,312,271 | B2 * | 12/2007 | Chen et al. | 524/493 |
| 7,790,798 | B2 * | 9/2010 | Chen et al. | 524/492 |
| 7,846,993 | B2 * | 12/2010 | Ko et al. | 523/212 |
| 2003/0114571 | A1 * | 6/2003 | Pan | 524/492 |
| 2006/0225615 | A1 * | 10/2006 | Raman et al. | 106/482 |
| 2010/0022684 | A1 * | 1/2010 | Wallen et al. | 523/334 |

FOREIGN PATENT DOCUMENTS

| KR | 1994-019795 | 2/1993 |
|---|---|---|
| KR | 1994-019797 | 2/1993 |
| KR | 2000-0075614 | 2/1997 |
| KR | 2002-0021407 | 2/2002 |

* cited by examiner

*Primary Examiner* — Marc Zimmer
(74) *Attorney, Agent, or Firm* — Mayback & Hoffman, P.A.; Gregory L. Mayback

(57) ABSTRACT

Provided are an organically modified silica master batch elastomer having superior affinity for silica and a method for preparing the same. A copolymer solution-polymerized from a conjugated diene-based monomer and a vinyl aromatic monomer is mixed in solution with organically modified silica having the silica modified with a specific aliphatic hydrocarbon to prepare the organically modified silica master batch elastomer. The organically modified silica master batch elastomer according to the present invention has improved mechanical properties, abrasion resistance and blending processability over the existing master batch elastomers containing common silica. Thus, when it is used as a tire material, improved fuel efficiency, abrasion resistance and wet traction may be expected.

7 Claims, No Drawings

MASTER BATCH ELASTOMETER CONTAINING ORGANICALLY MODIFIED SILICA AND METHOD OF PREPARING THE SAME

CROSS-REFERENCE TO RELATED APPLICATIONS

This application claims priority under 35 U.S.C. §119 to Korean Patent Application No. 10-2010-0134949, filed on Dec. 24, 2010, in the Korean Intellectual Property Office, the disclosure of which is incorporated herein by reference in its entirety.

STATEMENT REGARDING FEDERALLY SPONSORED RESEARCH OR DEVELOPMENT

Not Applicable

BACKGROUND OF THE INVENTION (a) Technical Field

The present invention relates to a master batch elastomer containing organically modified silica and a method for preparing the same. More particularly, the present invention relates to a master batch elastomer containing organically modified nanosilica having an aliphatic hydrophobic group and thus having maximized dispersibility as a tire reinforcing material and a dispersibility method for preparing the same.

(b) Background Art

In general, a tire tread is prepared by blending rubber with a filler. Typically, the rubber is a blend of a styrene-butadiene copolymer and a conjugated diene rubber, and the filler is carbon black, silica or a mixture thereof, as a reinforcing material.

Silica, being an eco-friendly material, has been gaining attentions as a tire filler material in the situation where environmental regulations become stricter and oil prices remain high. As a filler material for the so-called "green tire", its use is increasing rapidly. However, use of silica as the reinforcing material is problematic in that the silica particles tend to agglomerate through interaction to form large clusters, resulting in poor dispersibility. Since the dispersing of silica in rubber greatly affects the wearing and lifespan of a tire, it is desired to maximize the dispersibility of silica.

Often, a master batch type elastomer is prepared by mixing with carbon black in order to improve dispersibility of the reinforcing material and to simplify the tire manufacturing process. However, preparation of a silica master batch elastomer using a diene-based copolymer prepared by solution polymerization in commercial scale is limited since most of silica is lost during the steam stripping process because of the hydrophilicity of silica.

On the other hand, when hydrophobic silica is used as the tire reinforcing material, it is difficult to attain mechanical properties required for the tire because chemical bonding with rubber is impossible.

Various methods for more effective use of silica have been proposed to maximize its dispersibility and ensure good mechanical properties.

U.S. Pat. No. 5,925,713 proposes a technique of modifying the end group using a monomer having an epoxy group in order to improve affinity to a filler, and Korean Patent Application Publication Nos. 1994-019797 and 1994-019795 disclose examples of improving abrasion resistance and impact resistance by dispersing polydimethylsiloxane in the composition.

In addition, there have been various researches to modify the end group of rubber in order to improve dispersibility of silica used as a reinforcing filler of a tire. However, there has been limitation in improving the dispersibility of the filler only with the introduction of functional end groups. Some silica manufacturers have introduced a technique of preparing a silica master batch elastomer consisting of rubber and general-use silica using a specialized facility. However, due to the agglomeration of silica, the silica tends not to be sufficiently dispersed in the rubber and Mooney viscosity of the compound tends to increase, resulting in problems during processing and manufacturing of the tire [DKT 2006 Poster 33 "Rubber Filler Composition Based on Solution Polymers and Silica—Status of Developments"].

International Patent Application Publication No. WO 1998/37015 (Korean Patent Application Publication No. 2000-0075614) proposes hydrophobic silica having improved compatibility with rubber. But, although the use of hydrophobic silica as a tire reinforcing material improves compatibility with rubber, modulus, tensile property and abrasion property of the tire degrade greatly due to the difficulty in forming chemical bonding with the rubber.

Further, although Korean Patent Application Publication No. 2002-0021407 proposes a method of mixing latex rubber prepared by emulsion polymerization with silica or carbon black to prepare a silica or carbon black master batch for a tire. However, the copolymer prepared by emulsion polymerization tends not to exhibit the rolling resistance, high wet traction and low heat generation required for a high-performance tire.

As described above, a silica master batch elastomer having satisfactory properties has not been developed as yet.

SUMMARY OF THE INVENTION

The present invention is directed to proposing a method allowing maximization of dispersibility of silica which is used as a reinforcing material during solution polymerization and thus ensuring good mechanical properties. Specifically, the disclosure is directed to providing an organically modified silica master batch elastomer prepared by modifying the surface of silica with an aliphatic organosilane compound to prepare organically modified silica and then mixing it with a copolymer obtained from solution polymerization of a conjugated diene monomer and a vinyl aromatic monomer, and a method for preparing the same.

In one general aspect, the present invention provides a method for preparing an organically modified silica master batch elastomer, including:

(1) solution polymerizing a conjugated diene monomer with a vinyl aromatic monomer to prepare a copolymer;

(2) reacting silica with 1-10 wt % of an organosilane compound represented by Chemical Formula 1 and 1-10 wt % of a silane coupling agent represented by Chemical Formula 2, based on the weight of the silica, to prepare organically surface-modified silica; and (3) mixing 100 parts of the copolymer prepared in step (1) by weight with 10-150 parts of the organically modified silica prepared in step (2) by weight in solution phase and then drying to prepare a master batch elastomer:

wherein $R_1$ is a $C_2$-$C_{20}$ aliphatic hydrocarbon group; and

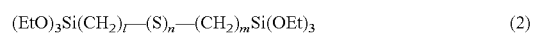

wherein each of l and m is independently an integer from 1 to 5, and n is an integer from 1 to 4.

In another general aspect, the present invention provides an organically modified silica master batch elastomer comprising:

100 parts of a copolymer prepared by solution polymerization of a conjugated diene monomer with an aromatic monomer by weight; and 10-150 parts of organically surface-modified silica by weight, which is surface-modified with 5-15 wt % of an organic compound comprising an organosilane compound represented by Chemical Formula 1 and a silane coupling agent represented by Chemical Formula 2, based on the weight of the silica:

$$R_1\text{—Si—}(OH)_3 \quad (1)$$

wherein $R_1$ is a $C_2$-$C_{20}$ aliphatic hydrocarbon group; and $$(EtO)_3Si(CH_2)_l\text{—}(S)_n\text{—}(CH_2)_mSi(OEt)_3 \quad (2)$$

wherein each of l and m is independently an integer from 1 to 5, and n is an integer from 1 to 4.

The above and other aspects and features of the present invention will be described infra.

DETAILED DESCRIPTION OF THE INVENTION

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

A method for preparing an organically modified silica master batch elastomer according to the present invention comprises:

(1) solution polymerizing a conjugated diene monomer with a vinyl aromatic monomer to prepare a copolymer;

(2) reacting silica with 1-10 wt % of an organosilane compound represented by Chemical Formula 1 and 1-10 wt % of a silane coupling agent represented by Chemical Formula 2, based on the weight of the silica, to prepare organically surface-modified silica; and (3) mixing 100 parts of the copolymer prepared in step (1) by weight with 10-150 parts of the organically modified silica prepared in step (2) by weight in solution phase and then drying to prepare a master batch elastomer:

$$R_1\text{—Si—}(OH)_3 \quad (1)$$

wherein $R_1$ is a $C_2$-$C_{20}$ aliphatic hydrocarbon group; and $$(EtO)_3Si(CH_2)_l\text{—}(S)_n\text{—}(CH_2)_mSi(OEt)_3 \quad (2)$$

wherein each of l and m is independently an integer from 1 to 5, and n is an integer from 1 to 4.

The solution polymerization for preparing the copolymer may be one commonly employed in the art. For the solvent, any one capable of dissolving the conjugated diene monomer and the vinyl aromatic monomer may be used without limitation. Specifically, one or more aromatic, aliphatic or cyclic compound, for example, cyclohexane, toluene, n-hexane, n-heptane, etc. may be used as the solvent. The solvent may be used in an amount of 1-10 parts by weight based on 1 part of the total monomer by weight.

In addition to the solvent, a coupling agent, a randomizing agent, an antioxidant, etc. may be used in the solution polymerization. The coupling agent may be a tin compound, a silicon compound, an epoxy compound, a polysiloxane compound, or the like. Specific examples include tin tetrachloride, silicon tetrachloride, tetraepoxy, polyfunctional polysiloxane, and the like, but are not limited thereto. The coupling agent may be used in an amount of 0.001-0.1 part by weight based on 1 part of the total monomer by weight.

The solution polymerization may be carried out at 10-120° C. When the temperature is below 10° C., a lot of time is required for the reaction because of low reaction rate and, therefore, commercial-scale application is impossible. And, when it exceeds 120° C., there are problems in safety and adequate control of molecular structure. Hence, the aforesaid range may be preferred.

The conjugated diene monomer and the vinyl aromatic monomer may be ones commonly used in the art and are not particularly limited. Specifically, the conjugated diene monomer may be 1,3-butadiene, isoprene or a mixture thereof, and the vinyl aromatic monomer may be styrene, α-methylstyrene, ethylstyrene, isopropylstyrene, halogenated styrene or a mixture thereof.

Next, silica is reacted with 1-10 wt % of an organosilane compound represented by Chemical Formula 1 and 1-10 wt % of a silane coupling agent represented by Chemical Formula 2, based on the weight of the silica, to prepare organically surface-modified silica. The compounds may be mixed approximately at 50-60° C. in a temperature-controllable reactor equipped with an agitator.

An example of the compound of Chemical Formula 1 is propyltriethoxysilane, which is phase-separable from water and is commercially available. And, examples of the compound of Chemical Formula 2 include bis(triethoxysilylpropyl)tetrasulfide and bis(triethoxysilylpropyl)disulfide, which are couplable with an organic elastomer and provide superior reinforcing effect.

The total amount of the organic compound comprising the organosilane compound of Chemical Formula 1 and the silane coupling agent of Chemical Formula 2 used for the preparation of the organically modified silica is maintained in the range of 2-20 wt % based on the weight of the silica. When the amount is less than 2 wt %, sufficient phase separation from water cannot be expected because it is difficult to make the hydrophilic silica hydrophobic. On the contrary, when it exceeds 20 wt %, the organic compound and the silane coupling agent without reacting with the silica surface may remain in the polymer, thereby resulting in poor mechanical properties. As a result, it is difficult to expect good abrasion resistance and low heat generation. More specifically, total amount of the organic compound may be 5-15 wt % based on the weight of the silica. This content corresponds to the degree of modification of the silica surface. That is to say, the organically modified silica may be surface-modified with 5-15 wt % of the organic compound comprising the organosilane compound and the silane coupling agent based on the weight of the silica.

More specifically, the organosilane compound of Chemical Formula 1 may be used in an amount of 1-10 wt % based on the weight of the silica. When the amount is less than 1 wt %, commercial-scale production of wet master batch (WMB) solution-polymerized styrene-butadiene rubber (SSBR) is difficult because of insufficient phase separation from water. On the contrary, when it exceeds 10 wt %, desired mechanical properties and abrasion resistance cannot be obtained because of poor compound properties. Hence, the aforesaid range may be preferred. And, the silane coupling agent of Chemical Formula 2 may be used in an amount of 1-10 wt % based on the weight of the silica. When the amount is less than 1 wt %, sufficient bonding between the elastomer and the silica cannot be maintained. On the contrary, when it exceeds 10 wt %, it may result in poor mechanical properties, increased Mooney viscosity during storage and mixing, and gelation. Hence, the aforesaid range may be preferred.

Next, 100 parts of the solution-polymerized copolymer by weight is mixed with 10-150 parts of the organically modified silica by weight in solution to prepare a mixture solution. The solvent used to prepare the solution may be the same aromatic, aliphatic or cyclic compound used as solvent when preparing the copolymer. The solvent is used in an amount of 10-30 wt % based on the total weigh to of the copolymer and the organically modified silica. The mixing may be carried out in a reactor equipped with an agitator at about 10-70° C. for about 0.5-3 hours.

When the amount of the organically modified silica is less than 10 parts by weight, the reinforcing effect provided by the organically modified silica cannot be ensured. And, when it exceeds 150 parts by weight, commercial-scale productivity may decrease due to phase separation of the organically modified silica from the elastomer. Hence, the aforesaid range may be preferred.

In order to improve processability and stability to oxidation of the master batch elastomer, an aromatic process oil commonly used in the related art may be added to the mixture. This additive component may be added in an amount which does not negatively affect the purpose of the present invention.

The prepared mixture is subjected to steam stripping and roll drying to prepare a master batch elastomer. The steam stripping and roll drying may be carried out by the methods commonly employed in the art and are not particularly limited.

The resultant master batch may be molded or extruded to be used as a cable sheath, a hose, a drive belt, a conveyor belt, a roll cover, a shoe sole, a gasket, a brake element, tire, etc. Especially, it is suitable for a tire tread.

When molding or extruding the master batch, a reaction accelerator, an antioxidant, a heat stabilizer, a light stabilizer, an anti-ozone agent, a processing aid, a plasticizer, an adhesive, a blowing agent, a dye, a pigment, a wax, an extender, an organic acid, an inhibitor, a metal oxide, an activator, etc. known in the rubber industry may be added.

The resultant master batch elastomer can solve the silica dust problem, reduce tire making time, and improve tire processability, silica dispersibility, mechanical properties and abrasion resistance, when used as a tire material, as compared to the existing silica tire.

EXAMPLES

The examples and experiments will now be described. The following examples and experiments are for illustrative purposes only and not intended to limit the scope of this disclosure.

Example 1

Styrene (150 g), 1,3-butadiene (438 g) and cyclohexane (3,600 g) were put in a 10-L stainless steel reactor. Then, ditetrahydrofurylpropane (0.5 g) was added to the reactor. Upon completion of the addition, temperature inside the reactor was adjusted to 35° C. while operating the agitator. When the reactor temperature reached the predetermined temperature, n-butyllithium (2.4 mmol) was added to the reactor, and an adiabatic heating reaction was carried out.

When the reaction temperature reached the highest temperature, which was approximately 100° C., 1,3-butadiene (12 g) was further added to substitute the reactive terminal group with butadiene.

After the reaction had been finished, the resultant polymer rubber (600 g) was transferred to a blend storage tank equipped with an agitator. Then, organically modified silica (330 g) dispersed in cyclohexane (1000 g) was added to the blend storage tank to mix the rubber and the silica in solution. The organically modified silica was one surface-modified with an organic compound comprising 3 wt % of propyltriethoxysilane and 7 wt % of bis(triethoxysilylpropyl)tetrasulfide (Si-69, Degussa) based on the weight of the silica.

Next, after mixing the organically modified silica with the rubber solution, an extender oil (225 g, 37.5 parts by weight based on 100 parts of the mixture of the organically modified silica and the rubber solution by weight) and butylated hydroxytoluene (BHT, 6 g, 1 part by weight based on 100 parts of the mixture of the organically modified silica and the rubber solution by weight), as antioxidant, were added. After sufficient agitation, the mixture was put in warm water heated with steam to remove the solvent. Then, after roll drying, a master batch elastomer was prepared.

To study the structure and physical properties of the resultant master batch elastomer, 1) polymer microstructure (NMR), 2) molecular weight and molecular weight distribution (GPC), and 3) Mooney viscosity of the polymer and the blend were measured. Further, dynamic properties of the blend were analyzed using a dynamic mechanical thermal analyzer (DMTA). The result is given in Table 1.

Example 2

A master batch elastomer was prepared in the same manner as in Example 1, except for using organically modified silica surface-modified with an organic compound comprising 3 wt % of propyltriethoxysilane and 10 wt % of bis(triethoxysilylpropyl)tetrasulfide based on the weight of the silica.

To study the structure and physical properties of the resultant master batch elastomer, 1) polymer microstructure (NMR), 2) molecular weight and molecular weight distribution (GPC), and 3) Mooney viscosity of the polymer and the blend were measured. Further, dynamic properties of the blend were analyzed using a DMTA. The result is given in Table 1.

Comparative Example 1

A master batch elastomer was prepared in the same manner as in Example 1, except for using common, non-surface-modified silica instead of organically modified silica.

To study the structure and physical properties of the resultant master batch elastomer, 1) polymer microstructure (NMR), 2) molecular weight and molecular weight distribution (GPC), and 3) Mooney viscosity of the polymer and the blend were measured. Further, dynamic properties of the blend were analyzed using a DMTA. The result is given in Table 1.

TABLE 1

|  | Silica modifying compound[4] | Molecular weight[2] | Styrene content[1] (%) | Vinyl content[1] (%) | Mooney viscosity |
|---|---|---|---|---|---|
| Ex. 1 | Propyltriethoxy-silane 3 wt % + Si-69[3] 7 wt % | 488,247 | 25 | 63 | 135 |
| Ex. 2 | Propyltriethoxy-silane 3 wt % + Si-69[3] 10 wt % | 488,247 | 25 | 63 | 135 |
| Comp. Ex. 1 | — | 488,247 | 25 | 63 | 135 |
| Comp. Ex. 2 | Propyltriethoxy-silane 3 wt % + vinyltriethoxy-silane 7 wt % | 488,247 | 25 | 63 | 135 |

[1]Styrene and vinyl contents: NMR analysis result
[2]Molecular weight: Distribution of total molecular weight
[3]Si-69: Bis(triethoxysilylpropyl)tetrasulfide
[4]The wt % of the silica modifying organic compound is based on the silica Test Example In order to evaluate the physical properties of the master batch elastomers prepared in Examples 1-2 and Comparative Examples 1-2, the components listed in Table 2 were blended, and blending processability and physical properties and dynamic properties after the blending were compared. The result is given in Table 3.

[Physical Property Measurement]
1. Hardness: Measured using a Shore-A hardness meter.
2. Tensile strength, 300% modulus and elongation: Measuring using a universal testing machine (UTM) according to ASTM 3189, Method B.
3. Dynamic property of vulcanized rubber (tan δ): Analyzed using a DMTA 5 instrument (Rheometric) under the condition of 10 Hz frequency and 0.1% modification.
4. Abrasion resistance: Analyzed using a DIN abrasion tester.

TABLE 2

| Components | WMB SSBR blending (g) | Components | DMB SSBR blending (g) |
|---|---|---|---|
| Organically modified silica elastomer SSBR | 155 | Organically modified silica elastomer SSBR | 100 |
| Stearic acid | 1.5 | Stearic acid | 1.5 |
| Zinc oxide (ZnO) | 2.5 | ZnO | 2.5 |
| Silica (#115) | — | Silica (#115) | 55 |
| Aromatic oil | 37.5 | Aromatic oil | 37.5 |
| Si-69 (TESPD) | 4.4 | Si-69 (TESPD) | 4.4 |
| CZ | 2.0 | CZ | 2.0 |
| DPG | 1.5 | DPG | 1.5 |
| Sulfur | 1.5 | Sulfur | 1.5 |

* Silica was added further during blending, in consideration of the lost amount.
* Si-69: Bis-(3-triethoxysilylpropyl)tetrasulfide
* DPG: 1,3-Diphenylguanidine
* CZ: N-Cyclohexylbenzothiazylsulfonamide
*WMB SSBR: Wet master batch solution-polymerized SBR
*DMB SSBR: Dry master batch solution-polymerized SBR

TABLE 3

|  | Example 1 | Example 2 | Comparative Example 1 |
|---|---|---|---|
| Compound Mooney viscosity | 75.9 | 77.7 | 75.7 |
| Hardness (Shore-A) | 47 | 48 | 50 |
| Tensile strength (kgf/cm²) | 145 | 162 | 146 |
| 300% modulus (kgf/cm²) | 59 | 66 | 65 |
| Elongation (%) | 553 | 544 | 514 |
| Compound $T_g$ (° C.) | 0 | 0 | 0 |
| Tan δ at 10° C. | 1.3644 | 1.3138 | 1.2702 |
| Tan δ at 60° C. | 0.0787 | 0.0842 | 0.0815 |
| DIN abrasion resistance | 0.2630 | 0.2595 | 0.2535 |

As seen in Table 3, Examples 1-2, in which the master batch elastomers were prepared by blending the organically modified silica according to the present invention, exhibited improved compound Mooney viscosity, tensile strength, tan δ at low temperature, and DIN abrasion resistance, when compared with Comparative Example 1. Further, they showed comparable or better hardness, 300% modulus, elongation, compound Tg, and tan δ at high temperature. Thus, it was confirmed that use of the organically modified silica according to the present invention results in improved silica dispersibility and mechanical properties as compared to when common silica is used.

When the master batch elastomer comprising the organically modified silica surface-modified using the specific organic compound according to the present invention is used as a tire material, silica dispersibility and compatibility are remarkably improved over the existing silica, thus providing satisfactory abrasion resistance and mechanical properties required for the high-performance tire as well as increased lifespan. Also, with improved wet traction characteristics over the existing silica tire, it provides improved safety with decreased stopping distance. In addition, the problems of silica dispersing and reduction of processing time involved in the tire manufacturing process can be solved and uniform physical properties can be attained.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A method for preparing an organically modified silica master batch elastomer, comprising:
    solution polymerizing a conjugated diene monomer with a vinyl aromatic monomer to prepare a copolymer;
    reacting silica with 1-10 wt % of an organosilane compound represented by Chemical Formula 1 and 1-10 wt % of a silane coupling agent represented by Chemical Formula 2, based on the weight of the silica, to prepare organically surface-modified silica; and
    mixing 100 parts of the copolymer by weight with 10-150 parts of the organically modified silica by weight in solution phase and then drying to prepare a master batch elastomer:

$$R_1-Si-(OH)_3 \quad (1)$$

wherein $R_1$ is a $C_2$-$C_{20}$ aliphatic hydrocarbon group; and

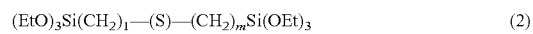

$$(EtO)_3Si(CH_2)_1-(S)_n-(CH_2)_mSi(OEt)_3 \quad (2)$$

wherein each of 1 and m is independently an integer from 1 to 5, and n is an integer from 1 to 4.

2. The preparation method according to claim 1, wherein the organically modified silica is surface-modified with 5-15 wt % of an organic compound comprising the organosilane compound and the silane coupling agent, based on the weight of the silica.

3. The preparation method according to claim 1, wherein the compound of Chemical Formula 1 is propyltriethoxysilane.

4. The preparation method according to claim 1, wherein the compound of Chemical Formula 2 is bis(triethoxysilylpropyl)tetrasulfide or bis(triethoxysilylpropyl)disulfide.

5. The preparation method according to claim 1, wherein the conjugated diene monomer is 1,3-butadiene, isoprene or a mixture thereof.

6. The preparation method according to claim 1, wherein the vinyl aromatic monomer is styrene, α-methylstyrene, ethylstyrene, isopropylstyrene, halogenated styrene or a mixture thereof.

7. The preparation method according to claim 1, wherein the solution polymerization and the mixing are performed in a solvent selected from cyclohexane, toluene, n-hexane and heptane.

\* \* \* \* \*